(12) United States Patent
Fukui

(10) Patent No.: US 6,247,873 B1
(45) Date of Patent: Jun. 19, 2001

(54) CONSTRUCTION METHODS FOR PREVENTING LAND EROSION AND IMPROVING STREAMS, OR FOR REVETMENTS, AND CONSTRUCTION METHODS FOR PREVENTING MOUNTAIN LANDSLIDES

(76) Inventor: Tomio Fukui, 18-5, Kamiuma 4-chome, Setagaya-ku, Tokyo 154-0011 (JP)

( * ) Notice: Subject to any disclaimer, the term of this patent is extended or adjusted under 35 U.S.C. 154(b) by 0 days.

(21) Appl. No.: 09/284,765

(22) PCT Filed: Oct. 20, 1997

(86) PCT No.: PCT/JP97/03778

§ 371 Date: Jun. 17, 1999

§ 102(e) Date: Jun. 17, 1999

(87) PCT Pub. No.: WO98/17869

PCT Pub. Date: Apr. 30, 1998

(30) Foreign Application Priority Data

Oct. 18, 1996 (JP) .................................................. 8-311146

(51) Int. Cl.[7] ........................................................ E02B 3/12
(52) U.S. Cl. ................................ 405/17; 405/15; 405/16; 405/258.1
(58) Field of Search ................................ 405/15, 16, 21, 405/28, 35, 258, 17

(56) References Cited

U.S. PATENT DOCUMENTS

| Re. 16,976 | | 5/1928 | Pringle . | |
|---|---|---|---|---|
| 426,807 | * | 4/1890 | Harrelson | 405/28 |
| 554,777 | * | 2/1896 | Harrelson | 405/35 |
| 752,781 | * | 2/1904 | Kerr | 405/15 |
| 864,481 | * | 8/1907 | Neale | 405/21 |
| 1,058,879 | * | 4/1913 | Maher | 405/28 |
| 1,151,445 | * | 8/1915 | Dean | 405/28 |
| 1,281,022 | * | 4/1918 | Kellner | 405/28 |
| 1,389,513 | * | 8/1921 | Kellner | 405/28 |
| 1,409,140 | * | 3/1922 | Bignell | 405/21 |
| 1,748,444 | * | 2/1930 | Dutton | 405/28 |
| 1,873,496 | * | 8/1932 | Snyder | 405/16 |
| 2,315,351 | * | 3/1943 | Schaefer | 405/258 |
| 2,844,005 | | 7/1958 | Rehfeld . | |
| 3,971,221 | | 7/1976 | Greenleaf . | |
| 5,259,696 | | 11/1993 | Beardsley . | |

FOREIGN PATENT DOCUMENTS

| 23330/70 | 12/1970 | (AU) . |
|---|---|---|
| 674998 A5 | 8/1990 | (CH) . |
| 2109196 | 5/1972 | (FR) . |
| 55-19325 | 5/1980 | (JP) . |
| 62-34885 | 7/1987 | (JP) . |
| 1-94104 | 4/1989 | (JP) . |
| 3-13613 | 1/1991 | (JP) . |

OTHER PUBLICATIONS

European Search Report PCT/JP97/03778.

* cited by examiner

*Primary Examiner*—Thomas B. Will
*Assistant Examiner*—Gary S. Hartmann
(74) *Attorney, Agent, or Firm*—F. David AuBuchon; Brinks Hofer Gilson & Lione

(57) ABSTRACT

Erosion or collapse of a stream or a river is prevented by mooring timber, stones, or the like with a longitudinal cable (steel cable) (1). Barrier-like members (3) such as timber and stones moored by using the longitudinal cable (1) are arranged substantially stepwise or parallel to each other on the ground near the eroded or collapsed place to prevent mountain landslides.

9 Claims, 9 Drawing Sheets

CONSTRUCTION METHODS FOR PREVENTING LAND EROSION AND IMPROVING STREAMS, OR FOR REVETMENTS, AND CONSTRUCTION METHODS FOR PREVENTING MOUNTAIN LANDSLIDES

Construction methods for preventing land erosion and improving streams, or for revetments, and construction methods for preventing mountain landslides

TECHNICAL FIELD

The present inventions relate to a method for simply and effectively carrying out erosion preventive works, revetment works, or the like for streams or rivers, without destroying the natural environment of streams in mountains, other rivers, etc. These inventions also relate to a construction method for simply and effectively stabilizing the ground surface on mountainsides without damaging the natural environment.

BACKGROUND ART

The erosion or collapse of mountains and streams is caused by the downward travel of earth and gravel produced upon the collapse of mountains by mainly rainfall, snowfall, earthquakes, or the like, whereas erosion or collapse of ordinary rivers is caused mainly by floods. However, because there are many techniques common to the prevention of these types erosions or collapses, mountain conservancy work techniques for preventing land erosion and improving streams and for revetments conventionally applied to mountains or streams will be described below.

Obviously, the best practice for preventing such erosion and collapse and for restoration from such erosion and collapse is to make full use of the water retention and mountainside-stabilizing ability of forests by covering a mountain with a forest, thereby perfecting a mountainous and forested environment so as to permit prevention or alleviation of erosion and collapse of mountainsides and streams even when a heavy rainfall or snowfall occurs.

However since very great costs and a long period of time are required to condition and maintain such a mountainous and forested environment, many artificial works have been constructed at the same time that efforts have been made to perfect the mountainous and forested environments. These works are characterized in that an independent structure is installed at a prescribed location in a mountainous district, thereby it being attempted to reduce the velocity and quantity of flowing water, earth, and gravel by the effects of the weight of the structure, or the bearing capacity of the bedrock and the like supporting the structure. Installing a structure having these functions requires much material, labor, and costs. Their outlines are as follows (see Sadao Hagiwara, "*Forest Water Utilization and Land-erosion Prevention*". (Dendrology, Vol. 9), Asakura Publishing Co., 1953; and Aritsune Takei, Ed., *Land-erosion Preventive Engineering*, Eibundo Publishing Co., 1993).

1. Works for Streams

Cases of stream erosion are divided into downward erosion or vertical erosion, in which the depth of the stream bed is increased, and side erosion or horizontal erosion, in which the bank of the stream is horizontally eroded. In the both cases, the banks of streams collapse due to their own weight, leading to landslides or the like. As a result, huge quantities of earth and gravel accumulate on the stream bed. Earth and gravel that accumulate on the stream bed in large quantities are carried by floodwaters, etc. downstream, and sometimes take the form of mudflows having considerable destructive power and cause a great deal of damage to areas surrounding the downstream end. Works for streams are constructed for the purpose of preventing such erosion, and restoring such eroded material, in streams, and more specifically, are classified into the following categories (a) to (e).

(a) Soil-Saving Dam Works

The long-established and most commonly used are the soil-saving dam (barrage) works. Works of this type have as their main object preventing downward erosion by providing a weir that runs perpendicular to a stream, and retaining gravel behind such a weir to make a new stream bed having a gentler slope, thereby reducing the power of the flowing water. A plurality of dams may be provided stepwise for a single stream, depending on the inclination of the stream and the extent of the erosion. The materials and construction method used for installing the dam are selected in accordance with the strength required for the dam. The following kinds of dams have conventionally been built:

i. Stonemasonry dam Wet masonry dam: using mortar Dry masonry dam: using no mortar Mixed masonry dam: using wet masonry for the main portions, and dry masonry for the other portions ii. Concrete dam iii. Wooden dam iv. Wire cylinder dam v. Plaited fence dam (b) Works for Groundsels Works of this type have an object to maintain the current condition of a stream bed, whereby a bank of a stream is protected from tributary washout. This is a work of solidifying a stream bed with stones, concrete, wire cylinders, plaited fences, mattresses (timber frames filled with stones), or the like.

(c) Revetment Works

This is to provide a certain wall to protect a stream bed from side erosion. Because this wall is made to be parallel with the watercourse, it is known also as a longitudinal dike. These works use stones, concrete, wire cylinders, plaited fences, wooden fences, boards, or the like.

(d) Spur Dikes

For the purpose of changing the direction of a watercourse center, a structure projecting with an appropriate length and in an appropriate direction from one shore or from both shores toward the center is made. Masonry or wire cylinders are employed.

(e) Watercourse Works

These are watercourse alteration works for avoiding disturbances through adjustment of watercourses or directing the watercourse from a weak shore to a stronger shore. A pitching, rubble, or concrete process is employed.

2. Mountainside Works

Works of this type are divided, in terms of the object, into two types, i.e., works for shaping an irregularly eroded area and works for ground surface stabilization.

(a) Open Cuts with Sloping Slides

These are works for shaping irregularly eroded ground (into topographic features suitable for planting).

(b) Stage-Making Works

These are works for reducing the speed of runoff flowing on the surface of the ground, and for promoting water absorption by the ground by providing stages on the opencut mountainside. To protect the steep inclined surfaces on the fronts of the stages, the following processes are adopted:

Turing (using turf)

Simple terracing works (using Japanese pampas grass, Miscanthus)

Mountainside wicker works

Mountainside masonry works (c) Works to Cover Mountainsides

These are works for preventing raindrops from hitting the ground by covering a mountainside made of earth, which has insufficient cohesive power. Thereby the velocity of runoff flowing on the surface of the ground is reduced. In these works the entire mountain is covered. As specific examples, works in which the mountainside is covered with bundles of fascine in a net shape should be noted.

(d) Works on Mountainside Watercourses

These are sodding works or works in which stones are pitched for protecting a recess in a mountainside where water collects and flows.

3. Landslide Preventive Works

These are culvert works and the like using fascine or wire cylinders filled with stones and gravel for the purpose of excluding groundwater that may cause a landslide.

4. Mudflow Preventive Works (a) Soil-Saving Dam Works

As described above (b) Works for Accumulating Gravel

These are works for accumulating earth and gravel on an expanded portion of a stream watercourse. Thereby the force of a mudflow is reduced.

The conventional techniques for mountain and forest work as described above have the following problems. For most of these problems, this is also the case with flood control works for ordinary rivers.

i. Needs of high costs and much labor

As described above, some mountain and forest work is always required anywhere there is mountainous land, and for a single work, the objective area to be covered by the work usually has a large expanse. Thus, when solid structures such as dams are to be constructed at many sites that are targeted, considerable labor, materials, and funds are required. With the limited financial capabilities of the national government or local governments, sufficient work cannot be accomplished. In such a state, unless advances are made, the collapse of the nation's land will continue due just to economic reasons.

2. Difficulties of Works and Operations

In most cases sites for mountain and forest works are usually narrow places between mountains. There are therefore serious difficulties in building a solid structure by operating modem construction equipment and transport vehicles. Also, the risk to human welfare is very high.

3. Necessity of Expertise

Sophisticated expertise and special technology are required to install a structure to prevent continuous natural erosion and to permit restoration of the eroded material. Even for, for example, constructing a dam, design and engineering based on scientific research and studies, and scientific knowledge, are necessary to determine at which site a dam having a predetermined strength is to be constructed. For this purpose, it is inevitable to rely upon a special civil engineering company, and there is almost no room to make full use of the knowledge and experience of ordinary forestry workers.

4. Difficulty in Procuring Materials for Works

Construction of a dam requires materials such as steel products, aggregates, stones, and concrete in large quantities. It is difficult to procure any of these materials locally, and it is therefore necessary to transport these materials over long distances from production areas.

5. Non-Flexibility of Facilities

Once structures such as dams are built, they form solid fixed facilities, and it is subsequently very difficult to modify, remove, or relocate such facilities.

6. Problems in Environmental Destruction Caused by Works

To construct a large-scale structure on mountainous land, it is necessary to partially destroy the mountainous land or modify its shape. In many cases the natural environment of the land is damaged by such a work. Further, it is highly probable that such a structure will give a feeling of incompatibility with the land and damage the natural scenery.

DISCLOSURE OF THE INVENTIONS

Figure 1:
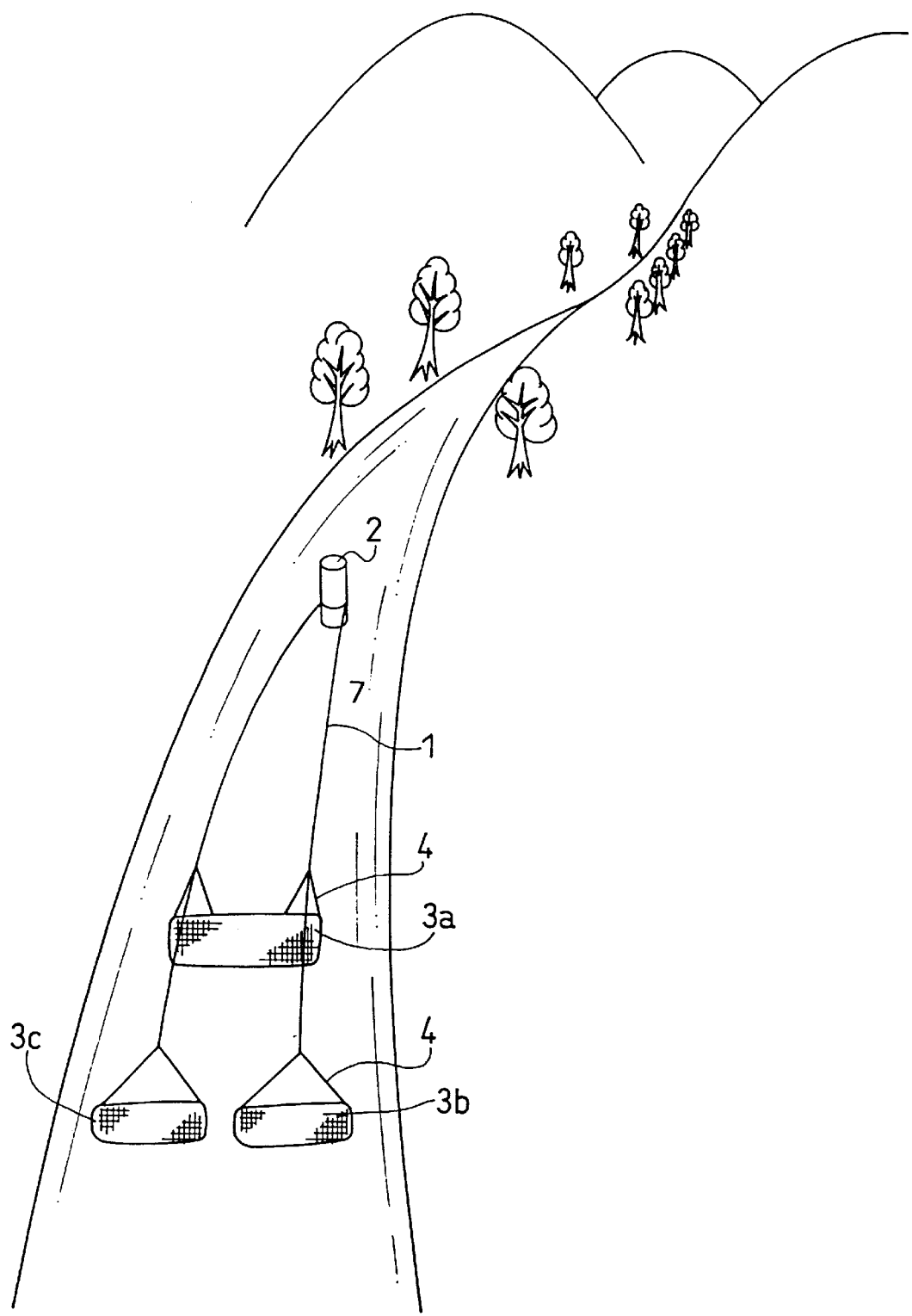
FIGS. 1 and 2 are schematic views for explaining a work on a stream or a river and a structure for preventing land erosion and improving a stream.

Embodiment 1 of the present inventions relates to a construction method for preventing land erosion and improving a stream, comprising:

(a) a step of directly or indirectly fixing at least one longitudinal cable (1) to a base point (2); and (b) a step of mooring at least two barrier-like members (3) directly by using said longitudinal cable (1) or by using a mooring cable (4) connected to said longitudinal cable (1), so that the at least two barrier-like members (3) are provided in a stream or a river substantially perpendicular to the direction of the current of water at an appropriate interval in the direction from the upper end to the lower end of the stream or river.

Embodiment 2 of the present inventions relates to a construction method for preventing land erosion and improving a stream, comprising:

(a) a step of directly or indirectly fixing at least two longitudinal cables (1) to a base point (2);

(b) a step of connecting said longitudinal cables (1) to each other by the use of at least one lateral cable (7); and (c) a step of mooring at least two barrier-like members (3) directly by using said longitudinal cables (1) and/or said lateral cable (7) or by using a mooring cable (4) connected to each longitudinal cable (1) and/or said lateral cable (7), so that the at least two barrier-like members (3) are provided in a stream or a river (10) substantially perpendicular to the direction of the current of water at an appropriate interval in the direction from the upper end to the lower end of the stream or river.

Embodiment 3 of the present inventions relates to a construction method for a revetment, comprising:

(a) a step of directly or indirectly fixing at least one longitudinal cable (1) to a base point (2); and (b) a step of mooring at least one barrier-like member (3) directly by using said longitudinal cable (1) or by using a mooring cable (4) connected to said longitudinal cable (1), so that said barrier-like member (3) is provided in a stream or a river (10) and along its bank.

Embodiment 4-1 of the present inventions relates to a construction method for preventing mountain landslides, comprising:

(a) a step of directly or indirectly fixing at least one longitudinal cable (1) to a base point (2) so as to provide the longitudinal cable (1) on both sides (20) of a mountain across a ridge of the mountain; and (b) a step of mooring at least two barrier-like members (3) for each side of the mountain directly by using said longitudinal cable (1) or by using a mooring cable (4) connected to said longitudinal cable (1), so that the at least two barrier-like members (3) are provided on each side of the mountain at an appropriate interval in the direction of the height of the mountain with the longer dimension of each barrier-like member (3) extending substantially at right angles to the direction of the height of the mountain:

Embodiment 4-2 of the present inventions relates to a construction method for preventing mountain landslides, comprising:

(a) a step of directly or indirectly fixing at least one longitudinal cable (1) to a base point (2); and (b) a step of mooring at least two barrier-like members (3) directly by using said longitudinal cable (1) or by using a mooring cable (4) connected to said longitudinal cable (1), so that the at least two barrier-like members (3) are provided at an appropriate interval in the direction of the height of a mountain (30) with the longer dimension of each barrier-like member (3) extending substantially at right angles to the direction of the height of the mountain;

wherein said base point (2) is provided on a slope of the mountain opposite the side of the mountain on which said barrier-like members (3) are provided and said longitudinal cable (1) is fixed across a ridge of the mountain; and Embodiment 4-3 of the present inventions relates to a construction method for preventing mountain landslides, comprising:

(a) a step of directly or indirectly fixing at least one longitudinal cable (1) to a base point (2) constituted by a cable that is wound around a mountain (30); and (b) a step of mooring at least two barrier-like members (3) directly by using said longitudinal cable (1) or by using a mooring cable (4) connected to said longitudinal cable (1), so that the at least two barrier-like members (3) are provided at an appropriate interval in the direction of the height of the mountain with the longer dimension of each barrier-like member (3) extending substantially at right angles to the direction of the height of the mountain.

Embodiment 5-1 of the present inventions relates to a construction method for preventing mountain landslides, comprising:

(a) a step of directly or indirectly fixing at least two longitudinal cables (1) to a base point (2) so as to provide the longitudinal cables (1) on both sides (20) of a mountain across a ridge of the mountain;

(b) a step of connecting said longitudinal cables (1) to each other with at least one lateral cable (7); and (c) a step of mooring at least two barrier-like members (3) for each side of the mountain, directly by using said longitudinal cables (1) and/or said lateral cable (7) or by using a mooring cable (4) connected to each longitudinal cable (1) and/or said lateral cable (7), so that the at least two barrier-like members (3) are provided on each side of the mountain at an appropriate interval in the direction of the height of the mountain with the longer dimension of each barrier-like member (3) substantially at right angles to the direction of the height of the mountain;

Embodiment 5-2 of the present invention relates to a construction method for preventing mountain landslides, comprising:

(a) a step of directly or indirectly fixing at least two longitudinal cables (1) to a base point (2);

(b) a step of connecting said longitudinal cables (1) to each other with at least one lateral cable (7); and (c) a step of mooring at least two barrier-like members (3) directly by using said longitudinal cables (1) and/or said lateral cable (7) or by using a mooring cable (4) connected to each longitudinal cable (1) and/or said lateral cable (7), so that the at least two barrier-like members (3) are provided at an appropriate interval in the direction of the height of a mountain with the longer dimension of each barrier-like member (3) substantially at right angles to the direction of the height of the mountain;

wherein said base point (2) is provided on a slope of the mountain opposite the side of the mountain on which said barrier-like members (3) are provided and said longitudinal cables (1) are fixed across a ridge of the mountain; and Embodiment 5-3 of the present inventions relates to a construction method for preventing mountain landslides comprising:

(a) a step of directly or indirectly fixing at least two longitudinal cables (1) to a base point (2) constituted by a cable that is wound around a mountain;

(b) a step of connecting said longitudinal cables (1) to each other with at least one lateral cable (7); and (c) a step of mooring at least two barrier-like members (3) directly by using said longitudinal cables (1) and/or said lateral cable (7) or by using a mooring cable (4) connected to each longitudinal cable (1) and/or said lateral cable (7), so that the at least two barrier-like members (3) are provided at an appropriate interval in the direction of the height of the mountain with the longer dimension of each barrier-like member (3) substantially at right angles to the direction of the height of the mountain.

Embodiment 6 of the present inventions relates to a construction method for preventing land erosion and improving a stream, comprising:

(a) a step of directly or indirectly fixing a lateral cable (7) to at least two base points (2); and (b) a step of mooring directly by using said lateral cable (7) or by using a mooring cable (4) connected to said lateral cable (7) at least one barrier-like member (3) in a stream or a river so as to be provided substantially perpendicular to the direction of the current of water;

wherein at least two sets of structures, each comprising said lateral cable (7), the base points (2), and the barrier-like member (3) as essential components, are placed, so that said barrier-like members (3) are provided in the stream or river at an appropriate interval in the direction from the upper end to the lower end of the stream or river.

Embodiment 7 of the present inventions relates to a land-erosion-preventive or stream-improving structure, comprising:

at least one longitudinal cable (1), a base point (2), and at least two barrier-like members (3), and further and optionally a mooring cable (4) and/or an auxiliary cable (5), wherein said longitudinal cable (1) is fixed to said base point (2) directly or indirectly via said auxiliary cable (5), and wherein said barrier-like members (3) are moored directly by using said longitudinal cable (1) or by using said mooring cable (4) connected to said longitudinal cable (1), so that the barrier-like members (3) are provided in a stream or a river substantially perpendicular to the direction of the current of water at an appropriate interval in the direction from the upper end to the lower end of the stream or river.

Embodiment 8 of the present inventions relates to a land-erosion-preventive or stream-improving structure, comprising:

at least two longitudinal cables (1), a base point (2), at least one lateral cable (7), and at least two barrier-like members (3), and further and optionally a mooring cable (4) and/or an auxiliary cable (5), wherein said longitudinal cables (1) are fixed to said base point (2) directly or indirectly via said auxiliary cable (5), and are connected to each other with said lateral cable (7), and said barrier-like members (3) are moored directly by using said longitudinal cables (1) and/or said lateral cable (7), or by using said mooring cable (4) connected to each longitudinal cable (1) and/or said lateral cable (7), so that the barrier-like members (3) are provided in a stream or river substantially perpendicular to the direction of the current of water at an appropriate interval in the direction from the upper end to the lower end of the stream or river.

Embodiment 9 of the present inventions relates to a revetment structure comprising at least one longitudinal cable (1), a base point (2), and at least one barrier-like member (3), and further and optionally a mooring cable (4) and/or an auxiliary cable (5), wherein said longitudinal cable (1) is fixed to said base point (2) directly or indirectly via said auxiliary cable (5), and said barrier-like members (3) are moored directly by using said longitudinal cable (1) or by using said mooring cable (4) connected to said longitudinal cable (1), so that said barrier-like members (3) are placed in a stream or river along its bank.

Embodiment 10 of the present inventions relates to a mountain-landslide-preventive structure, comprising:

at least one longitudinal cable (1), a base point (2), and at least two barrier-like members (3), and further and optionally a mooring cable (4) and/or an auxiliary cable (5), wherein said longitudinal cable (1) is fixed to said base point (2) directly or indirectly via said auxiliary cable (5) so as to provide the longitudinal cable (1) on both sides of a mountain across a ridge of the mountain, and said barrier-like members (3) are moored directly by using said longitudinal cable (1) or by using said mooring cable (4) connected to said longitudinal cable (1), so that the barrier-like members (3) are provided at an appropriate interval in the direction of the height of the mountain with their longer dimensions substantially at right angles to the direction of the height of the mountain;

Embodiment 10-2 of the present inventions relates to a mountain-landslide-preventive structure, comprising:

at least one longitudinal cable (1), a base point (2), and at least two barrier-like members (3), and further and optionally a mooring cable (4) and/or an auxiliary cable (5), wherein said barrier-like members (3) are moored directly by using said longitudinal cable (1) or by using said mooring cable (4) connected to said longitudinal cable (1), so that the barrier-like members (3) are provided at an appropriate interval in the direction of the height of the mountain with their longer dimensions substantially at right angles to the direction of the height of the mountain, said base point (2) is provided on a slope of the mountain opposite the side of the mountain on which said barrier-like members (3) are provided, and said longitudinal cable (1) is fixed to said base point (2) directly or indirectly via said auxiliary cable (5) across a ridge of the mountain; and Embodiment 10-3 of the present inventions relates to a mountain-landslide-preventive structure, comprising:

at least one longitudinal cable (1), a base point (2) constituted by a cable that is wound around a mountain, and at least two barrier-like members (3), and further and optionally a mooring cable (4), wherein said longitudinal cable (1) is fixed to said base point (2), and said barrier-like members (3) are moored directly by using said longitudinal cable (1) or by using said mooring cable (4) connected to said longitudinal cable (1), so that the barrier-like members (3) are provided at an appropriate interval in the direction of the height of the mountain with their longer dimensions substantially at right angles to the direction of the height of the mountain.

Embodiment 11-1 of the present inventions relates to a mountain-landslide-preventive structure, comprising:

at least two longitudinal cables (1), a base point (2), at least one lateral cable (7), and at least two barrier-like members (3), and further and optionally a mooring cable (4) and/or an auxiliary cable (5), wherein said longitudinal cables (1) are fixed to said base point (2) directly or indirectly via said auxiliary cable (5) so as to provide the longitudinal cables (1) on both sides of a mountain across a ridge of the mountain and are connected to each other by said lateral cable (7), and said barrier-like members (3) are moored directly by using said longitudinal cables (1) and/or said lateral cable (7), or by using said mooring cable (4) connected to each longitudinal cable (1) and/or said lateral cable (7), so that the barrier-like members (3) are provided at an appropriate interval in the direction of the height of a mountain with their longer dimensions substantially at right angles to the direction of the height of the mountain;

Embodiment 11-2 of the present inventions relates to a mountain-landslide-preventive structure, comprising:

at least two longitudinal cables (1), a base point (2), at least one lateral cable (7), and at least two barrier-like members (3), and further and optionally a mooring cable (4) and/or an auxiliary cable (5), wherein said barrier-like members (3) are moored directly by using said longitudinal cables (1) and/or said lateral cable (7), or by using said mooring cable (4) connected to each longitudinal cable (1) and/or said lateral cable (7), so that the barrier-like members (3) are provided at an appropriate interval in the direction of the height of the mountain with their longer dimensions substantially at right angles to the direction of the height of the mountain, said base point (2) is provided on a slope of the mountain opposite the side of the mountain on which said barrier-like members (3) are provided, and said longitudinal cables (1) are fixed to said base point (2) directly or indirectly via said auxiliary cable (5) across a ridge of the mountain and are connected to each other by said lateral cable (7); and Embodiment 11-3 of the present inventions relates to a mountain-landslide-preventive structure comprising:

at least two longitudinal cables (1), a base point (2) constituted by a cable that is wound around a mountain, at least one lateral cable (7), and at least two barrier-like members (3), and further and optionally a mooring cable (4), wherein said longitudinal cables (1) are fixed to said base point (2) and are connected to each other by said lateral cable (7), and said barrier-like members (3) are moored directly by using said longitudinal cables (1) and/or said lateral cable (7) or by using said mooring cable (4) connected to each longitudinal cable (1) and/or said lateral cable (7), so that the barrier-like members (3) are provided at an appropriate interval in the direction of the height of the mountain with their longer dimensions substantially at right angles to the direction of the height of the mountain.

Embodiment 12 of the present inventions relates to a land-erosion-preventive or stream-improving structure comprising:

a lateral cable (7), at least two base points (2), and at least one barrier-like member (3), and further and optionally a mooring cable (4) and/or an auxiliary cable (5), wherein said lateral cable (7) is fixed to said base points (2) directly or indirectly via said auxiliary cable (5), and said barrier-like member (3) is moored directly by using said lateral cable (7) or by using said mooring cable (4) connected to said lateral cable (7), so as to be provided in a stream or a river substantially perpendicular to the direction of the current of water.

Specific embodiments of said construction method for preventing land erosion and improving a stream include one of or a combination of two or more of:

a) a case where the base point (2) is provided on land along the stream or river;

b) a case where the base point (2) is provided in the stream or river;

c) a case where the base point (2) is a tree, a rock, or an artificial structure;

d) a case where said longitudinal cable (1) is directly fixed to said base point (2);

e) a case where said longitudinal cable (1) is indirectly fixed to said base point (2) via an auxiliary cable (5);

f) a case where said barrier-like members (3) are selected from the group consisting of a single piece of timber, bound timber, timber connected in a venetian-blind shape, a concrete block, a wire cylinder filled with stones, and a sandbag;

g) a case where said barrier-like members (3) are directly moored by using said longitudinal cable (1) and/or lateral cable (7);

h) a case where said barrier-like members (3) are moored by using said mooring cable (4);

i) a case where there are provided at least three barrier-like members (3), including at least two barrier-like members (3) which are placed side-by-side and which may be connected to each other with a connecting cable (6);

j) a case where the base point (2) is provided on any location chosen from a slope of a mountain on the side where the stream or river is located, a mountain ridge, and a slope of a mountain opposite the side where the stream or river is located;

k) a case where said lateral cable (7) is directly fixed to said base point (2);

l) a case where said lateral cable (7) is indirectly fixed to said base point (2) via an auxiliary cable (5); and m) a case where at least one set of structures, each comprising a lateral cable (7), a base point (2), and a barrier-like members (3) as essential components, comprise at least two barrier-like members (3) that are placed side-by-side and which may be connected to each other with said lateral cable (7).

Specific embodiments of said construction method for a revetment include one of or a combination of two or more of:

a) a case where the base point (2) is provided on land along the stream or river;

b) a case where the base point (2) is provided in the stream or river;

c) a case where the base point (2) is a tree, a rock, or an artificial structure;

d) a case where said longitudinal cable (1) is directly fixed to said base point (2);

e) a case where said longitudinal cable (1) is indirectly fixed to said base point (2) via an auxiliary cable (5);

f) a case where said barrier-like member (3) is selected from the group consisting of a single piece of timber, bound timber, timber connected in a venetian-blind shape, a concrete block, a wire cylinder filled with stones, and a sandbag;

g) a case where said barrier-like member (3) is directly moored by using said longitudinal cable (1);

h) a case where barrier-like member (3) is moored by using said mooring cable (4);

i) a case where there are provided at least two barrier-like members (3) which are connected to each other in series by a connecting cable (6); and j) a case where the base point (2) is provided on any location chosen from a slope of a mountain on the side where the stream or river is located, a mountain ridge, and a slope of a mountain opposite the side where the stream or river is located.

Specific embodiments of said construction method for preventing mountain landslides include one of or a combination of two or more of:

a) a case where the base point (2) is a tree, a rock, or an artificial structure;

b) a case where said longitudinal cable (1) is directly fixed to said base point (2);

c) a case where said longitudinal cable (1) is indirectly fixed to said base point (2) via an auxiliary cable (5);

d) a case where said barrier-like members (3) are selected from the group consisting of a single piece of timber, bound timber, timber connected in a venetian-blind shape, a concrete block, a wire cylinder filled with stones, and a sandbag;

e) a case where said barrier-like members (3) are moored so as to be provided stepwise on a mountainside;

f) a case where said barrier-like members (3) are directly moored by using said longitudinal cable (1) and/or lateral cable (7);

g) a case where said barrier-like members (3) are moored by using said mooring cable (4);

h) a case where on at least one side of a mountain there are provided at least three barrier-like members (3), including at least two barrier-like members (3) which are placed side-by-side and which may be connected to each other with a connecting cable (6);

i) a case where said at least one barrier-like member (3) is provided at each end of said longitudinal cable (1); and j) a case where the base point (2) is further provided on a mountain ridge.

The concept of the term "cable" as used in the present inventions includes a longitudinal cable (1), a mooring cable (4), an auxiliary cable (5), a connecting cable (6), and a lateral cable (7) in the first to twelfth embodiments of the present inventions above, and further includes other types of cables.

Best Mode for Carrying Out the Inventions

The preferred embodiments of the present inventions will be described below with reference to the drawings.

FIG. 1 is a schematic view for explaining a work on a stream or a river for preventing land erosion and improving a stream, and a land-erosion-preventive or stream-improving structure.

In FIG. 1, a single longitudinal cable (1) is used. The longitudinal cable (1) is directly fixed to a base point (2) made of concrete installed in the stream. Barrier-like members (3a, 3b, 3c) are connected to the longitudinal cable (1) via mooring cables (4). In this embodiment, three barrier-like members are used, and relative to the barrier-like member (3a), the barrier-like members (3b) and (3c) are positioned at an appropriate interval in the direction from the upper end to the lower end of the stream, i.e., in the direction that the water flows. The barrier-like members (3b) and (3c) are placed side-by-side. Further, the barrier-like members (3a, 3b and 3c) are moored substantially perpendicular to the direction of the current of water, i.e., with the longer dimension of them extending across the river. As a result, the barrier-like members (3b) and (3c) are arranged substantially parallel to the barrier-like member (3a) and form steps. In this embodiment, the barrier-like members (3a, 3b and 3c) are sandbags.

Figure 2:
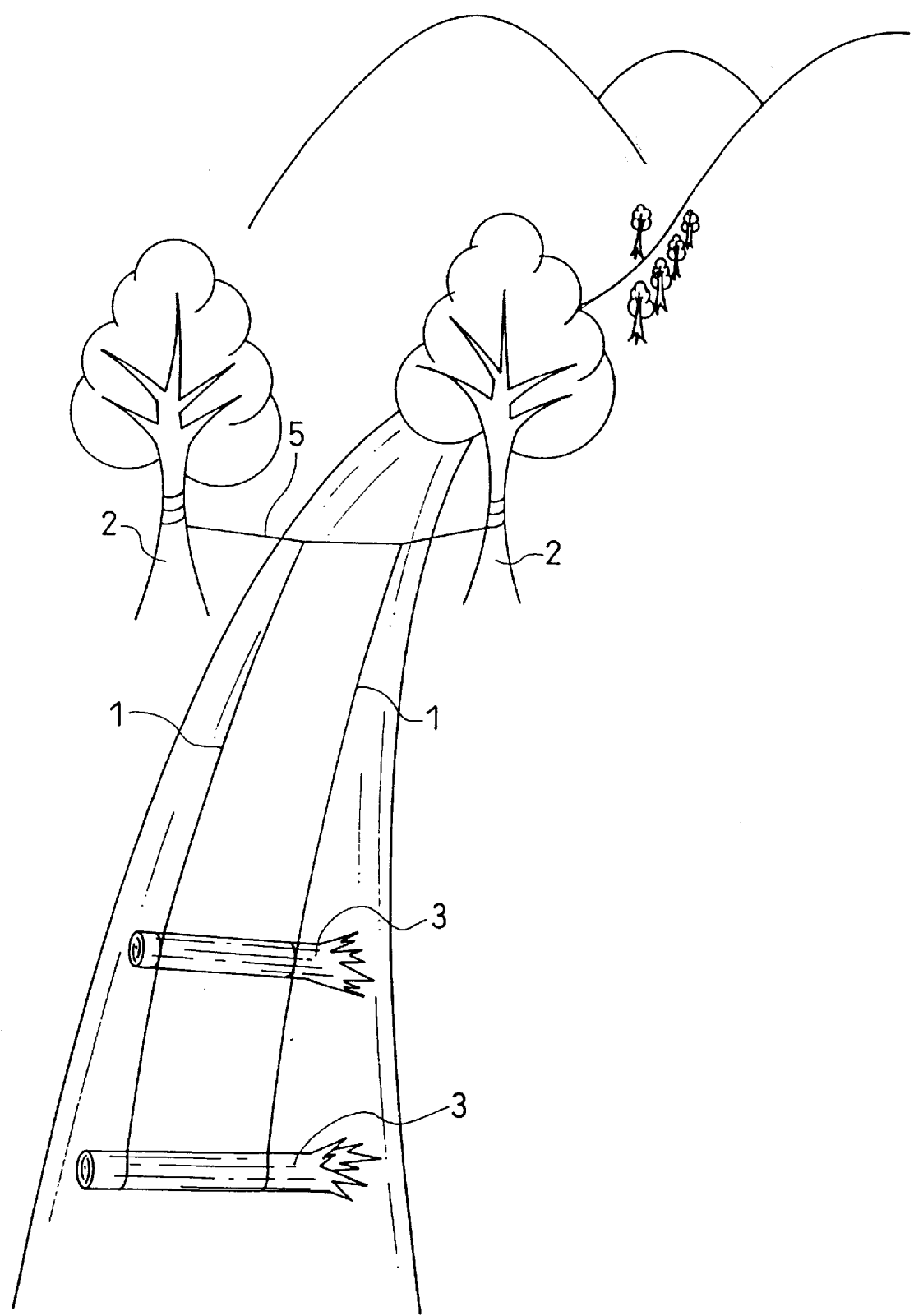

FIG. 2 is also a schematic view for explaining a work on a stream or a river for preventing land erosion and improving a stream, and a land-erosion-preventive or stream-improving structure.

In FIG. 2, two longitudinal cables (1) are used. The longitudinal cables (1) are fixed to base points (actually, trees) (2) via an auxiliary cable (5). The barrier-like members (3) consist of timber, and are directly moored by the longitudinal cables (1).

Figure 3:
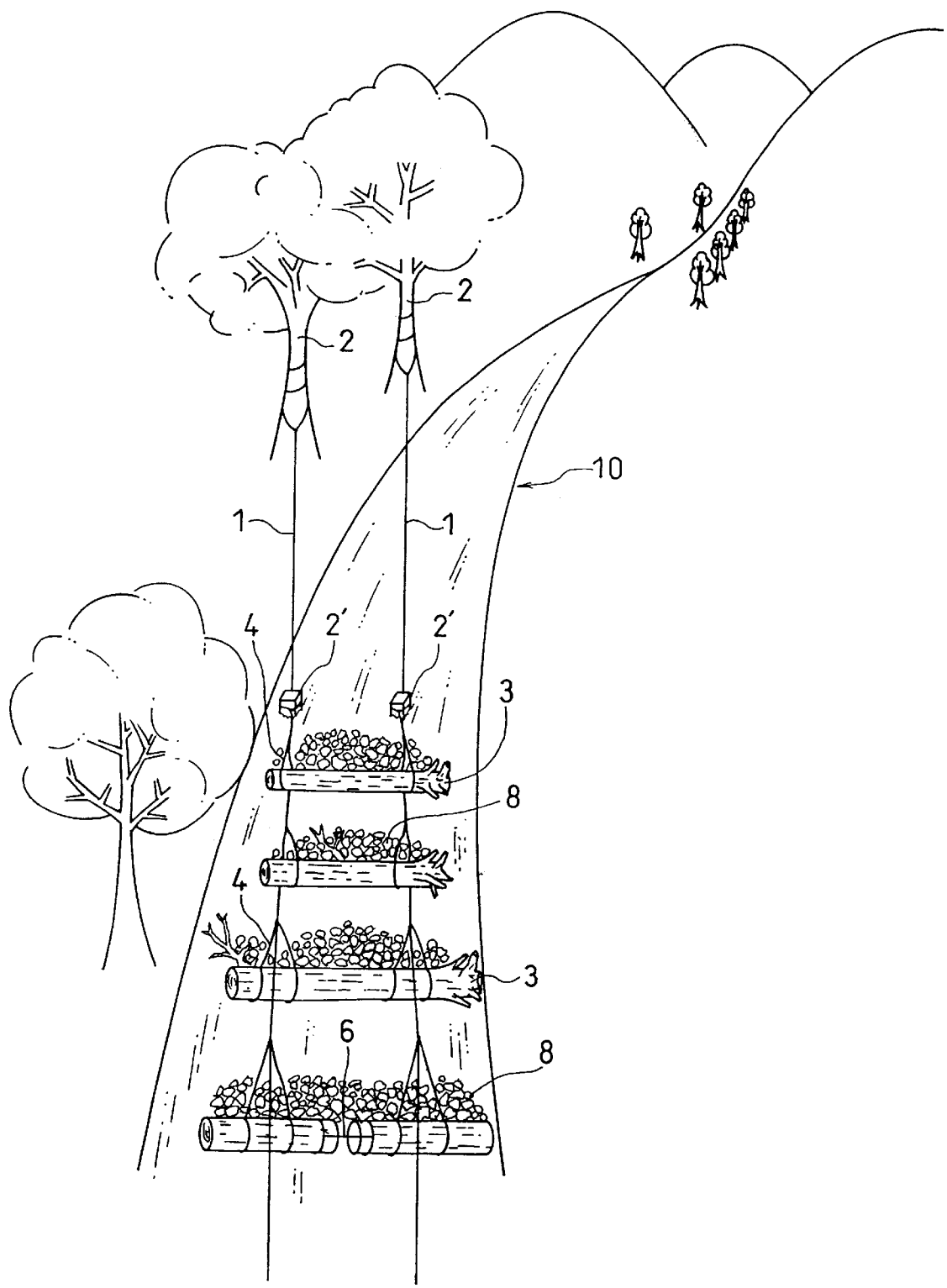
FIG. 3 is a schematic view for explaining a work for preventing erosion of a stream bed and a structure for preventing land erosion and improving a stream.

FIG. 3 is a schematic view for explaining a work and a land-erosion control structure for preventing erosion of a stream bed.

In FIG. 3, two longitudinal cables (1) are fixed to large-diameter standing trees (2) located outside the stream and concrete blocks (2') provided in the stream. That is, a standing tree that is naturally present on land along the inclined shore of the stream and concrete blocks, which are artificial structures, are used as base points (2 and 2'). In this case, when the individual base points (2 and 2') are not sufficiently solid, using more base points will suffice. According to the increasing length of a longitudinal cable (1), the resistance of the longitudinal cable (1) and the like to downward and sideward tension acting on the base points (2 and 2') and the longitudinal cable (1) increases. This increase in resistance is caused by the increase in the weight of the longitudinal cable (1) resulting from its greater length and the increase in general in the necessary number of the members of the base points (2), resulting in the resistance of the base points (2) being added to the above resistance.

In FIG. 3, timber, which is a natural product, is used as a barrier-like member (3). As shown in FIG. 3, the barrier-like members (3) may be moored so as to ride on the longitudinal cable (1) (the mooring method for the two barrier-like members (3) that are provided upstream), or may be moored so as to run under the longitudinal cable (1) (the mooring method for the two barrier-like members that are provided downstream). In the former case, the longitudinal cables (1) become more stable, while in the latter case, the barrier-like members (3) become more stable. Mooring cables (4) are used for mooring. At the lowest part of the river in that figure, each of the two barrier-like members (3) is moored by using each of the two longitudinal cables (1). In this case, a smaller (shorter in the longer dimension) barrier-like member (3) can be used, Further, because a river has an increased width toward the downstream end, it may sometimes be necessary to place the barrier-like members (3) side-by-side in the transverse direction so as to cope with the increased width of the river. In the embodiment shown in FIG. 3, the barrier-like members (3) that are placed side-by-side are connected to each other with a connecting cable (6) to stabilize the barrier-like members (3). About, for example, the moorage of the second barrier-like member (3) from the downstream side in FIG. 3, among the parts designated as mooring cables (4) in the above, the parts branching from the longitudinal cable (1) to be two cables may be considered as parts of the longitudinal cable (1), and only the part that winds around the timber may be considered as the mooring cable (4).

In the embodiment in FIG. 3, over time these barrier-like members (3) become capable of acting as a dam. Earth and gravel (8) are retained upstream of these barrier-like members (3) to raise the stream bed to reduce the velocity of the water flow, thereby preventing the longitudinal erosion of the stream bed. By accumulating earth and gravel (8), the barrier-like members (3) progressively become firmly secured at certain positions, and thus their positional stability increases. In this embodiment, the effect of preventing longitudinal erosion is more remarkable as the number of barrier-like members (3) is increased and the intervals therebetween are reduced.

Figure 9:
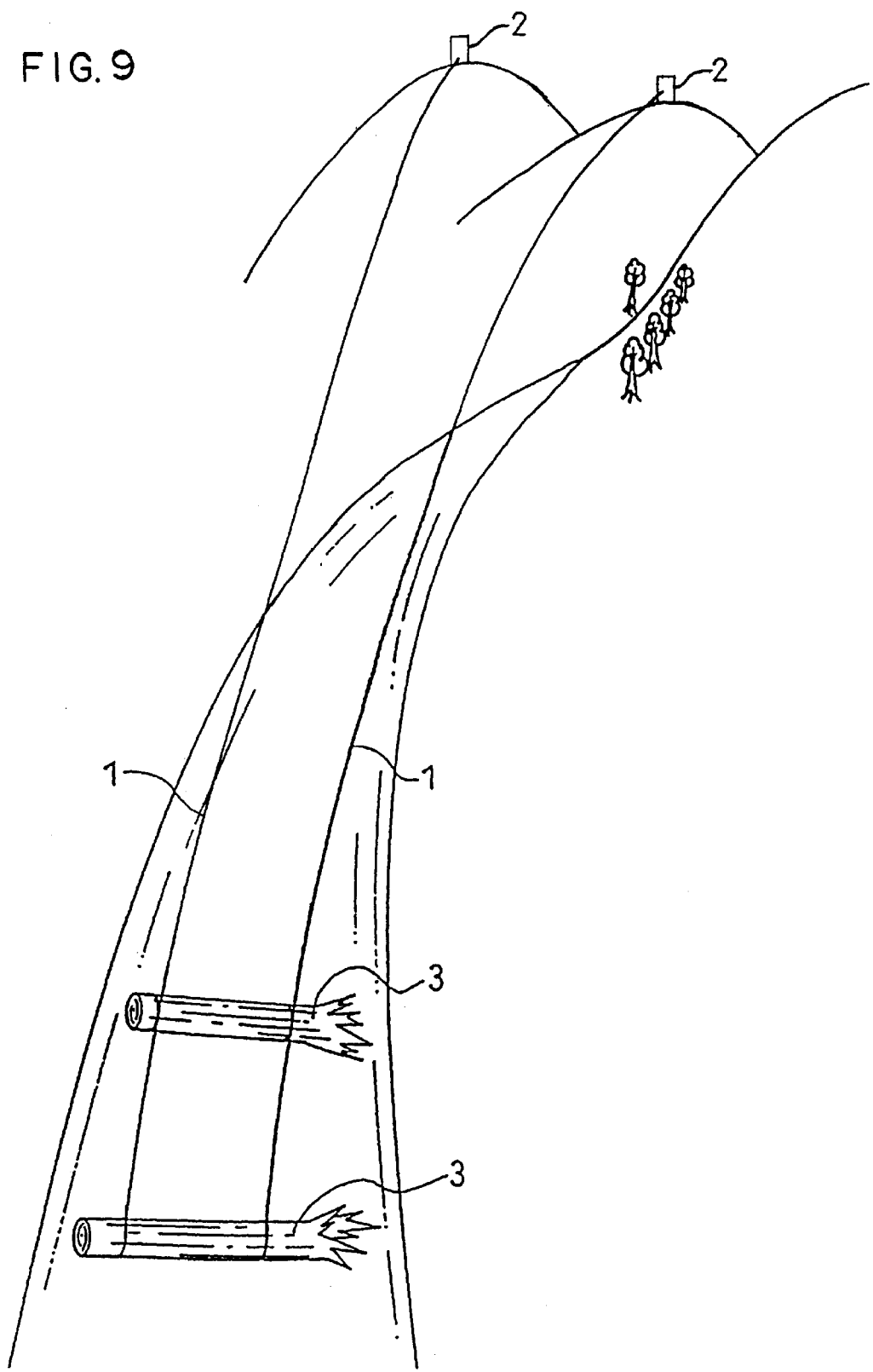
FIG. 9 is a schematic view for explaining a work on a stream or a river for preventing land erosion and improving a stream wherein the base points are located on the ridge of a mountain.

In the embodiment shown in FIG. 9 the longitudinal cables (1) mooring the barrier-like members (3) are connected to the base points (2) that are located on the ridges of mountains.

Figure 4:
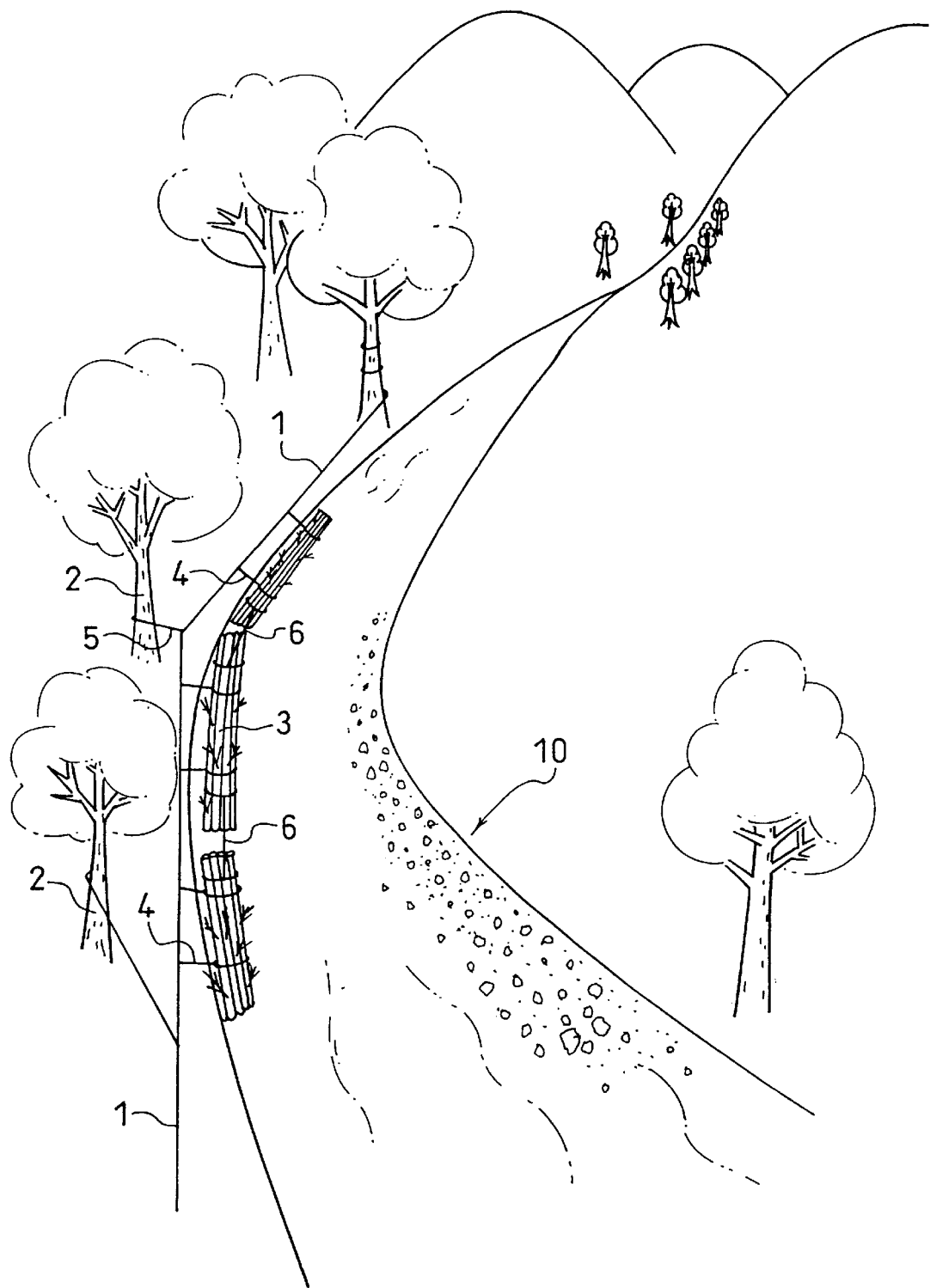
FIG. 4 is a schematic view for explaining a work for a revetment of a stream and a revetment structure.

FIG. 4 is a schematic view for explaining a work for a revetment of a stream and a revetment structure.

In FIG. 4, a single longitudinal cable (1) is fixed directly to base points (actually, trees) (2) present on land outside a stream or by the use of an auxiliary cable (5). The base points (2) are located along the eroded bank of the stream. The barrier-like members (3) are several pieces of timber bound in a venetian-blind shape. In this embodiment, the barrier-like members (3) are moored to the longitudinal cable (1) via mooring cables (4), and are connected to each other in series by connecting cables (6).

For the purpose of a revetment in this embodiment, the barrier-like members (3) are moored so as to be along the shore of the stream, namely, with their longer dimensions parallel to the current.

By employing such a revetment work, earth and gravel accumulate around the barrier-like members (3) to perform a function similar to that of a weir, thus protecting the shore of the stream.

Figure 5:
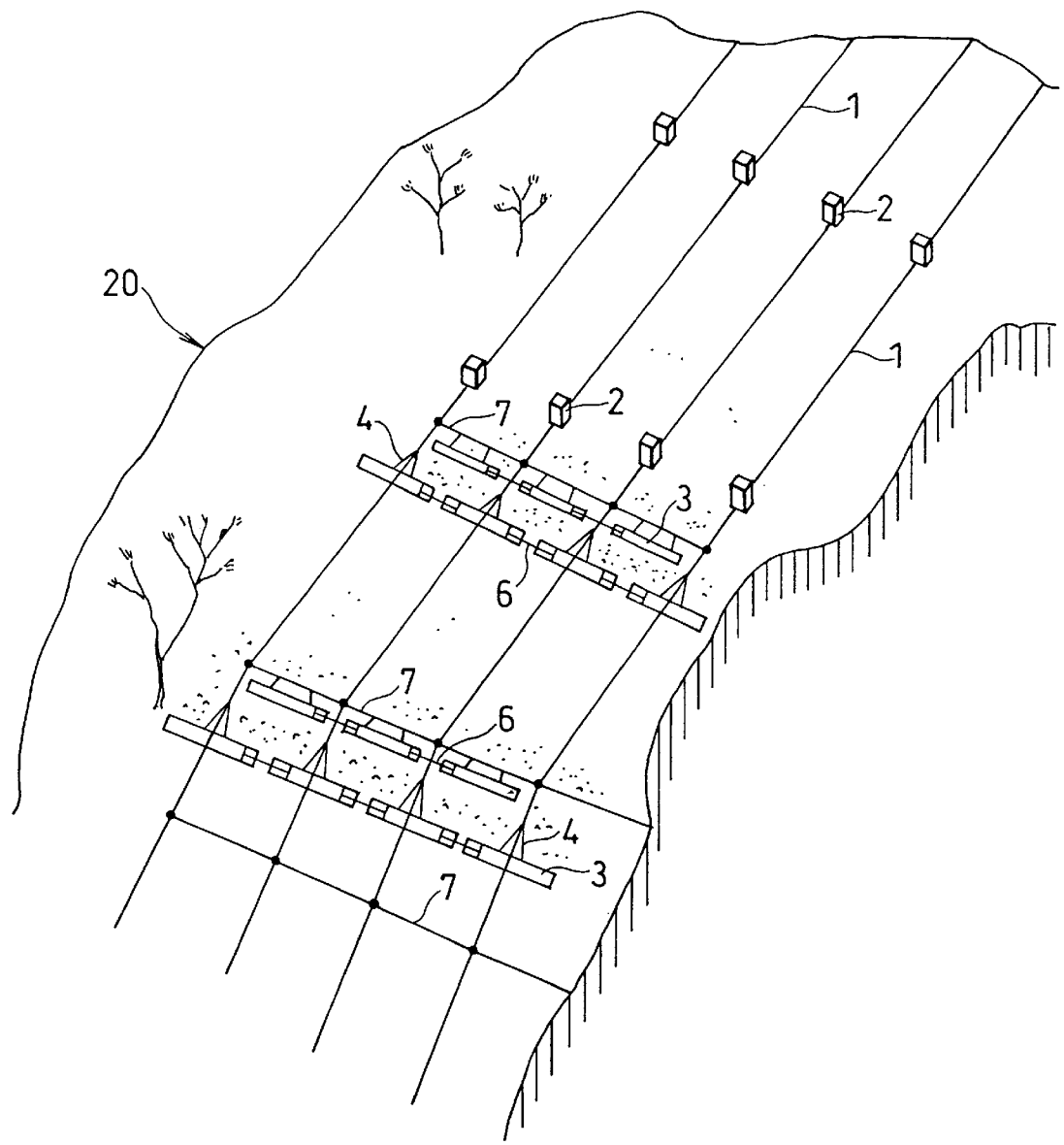
FIG. 5 is a schematic view for explaining a work for stabilizing earth in a mountainside and a mountain-landslide-preventive structure.

FIG. 5 is a schematic view for explaining a work for stabilizing earth in a mountainside and a mountain-landslide-preventive structure.

In FIG. 5, four longitudinal cables (1) are installed in such a form that each longitudinal cable (1) is fixed to several base points (2) on a wide and bare mountainside (20) suffering from increasing collapse. The longitudinal cables (1) run across the mountain ridge (the peak of the mountain) and extend to the opposite side (not shown) of the mountain. Of course, base points (2) are also provided on the opposite side of the mountain. That is, two base points (2) provided on the sites nearest to the mountain top in FIG. 5 (one is shown in the figure, and the other, which is provided on the opposite side of the mountain, is not shown in this figure) are connected with the longitudinal cable (1), like loads that are arranged so as to be balanced. At need, base points (2) may also be provided on the mountain ridge. The distance between the longitudinal cables (1) may be appropriately selected. These longitudinal cables (1) are connected to each other with lateral cables (7). A plurality of barrier-like members (3) are moored to the longitudinal cables (1) and the lateral cables (7) via mooring cables (4). The barrier-like members (3) are connected to each other with connecting cables (6) and placed side-by-side. As in this embodiment, the barrier-like members (3) are arranged with their longer dimensions extending substantially at right angles to the direction of the height of a mountain. The barrier-like member's (3) are placed on the mountainside so as to be provided with appropriate intervals between them, in the direction of the height of a mountain. It is not always necessary that all these intervals be equal. That is, as in this embodiment, it is not always necessary that the barrier-like members (3) be regularly arranged stepwise. The collapse of earth and sand can also be inhibited to stabilize the mountainside by mooring as many barrier-like members (3) as possible irregularly over the entire mountainside.

In the embodiment shown in FIG. 5, over time earth and sand are retained on the upper side of the barrier-like members (3) to stabilize the mountainside (20), thus permitting planting, furling, or the like on the thus stabilized mountainside (20).

Figure 6:
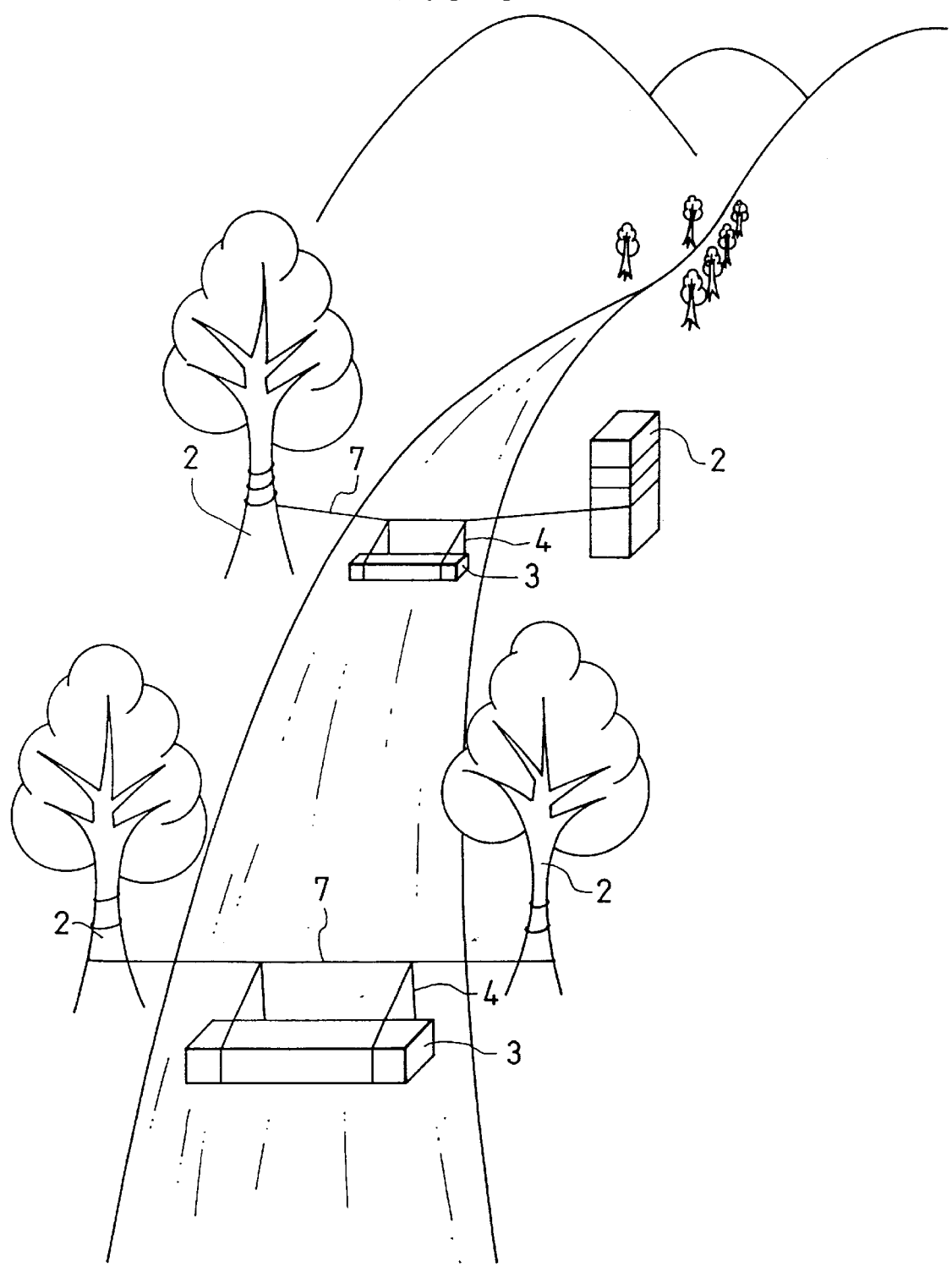
FIG. 6 is a schematic view for explaining a work on a stream or a river for preventing land erosion and improving a stream, and a land-erosion-preventive or stream-improving structure.

FIG. 6 is a schematic view for explaining a work on a stream or a river for preventing land erosion and improving a stream, and a land-erosion-preventive or stream-improving structure.

In the upstream side of the structure shown in FIG. 6, the lateral cable (7) is fixed to a tree (2) and a concrete block (2). On the other hand, in the structure in the downstream side, the lateral cable (7) is fixed to two trees (2). Because on the downstream side there are available trees (2) suitable for use as base points (2) at positions that almost correspond to each other on both shores of the stream, the trees are used as the base points (2). In the upstream side, in contrast, no tree is available on one shore; a concrete block (2') is placed as a base point (2') at an appropriate position on the shore opposite to that having a tree (2). When no tree or the like suitable for use as a base point (2) is available at an appropriate position, it is necessary to provide an artificial base point (2) as described above. However, when there are trees but their strengths are considered to be insufficient, auxiliary cables (5) may be wound around a plurality of trees on each shore, and lateral cables (7) may be connected to a position where the auxiliary cables (5) are tied.

In this embodiment, concrete blocks (3) are used as barrier-like members (3), and are moored to lateral cables (7) by the use of mooring cables (4).

One of the technical ideas on which the present inventions are based is to disperse the force acting on the barrier-like members and the like when a mudflow, etc. occurs, by using a plurality of barrier-like members. As in the embodiment shown in FIG. 6, it is therefore necessary to provide a structure in which a plurality of barrier-like members are present in a stream or a river at an appropriate interval in the direction from the upper end to the lower end, even when no longitudinal cable is used.

Figure 7:
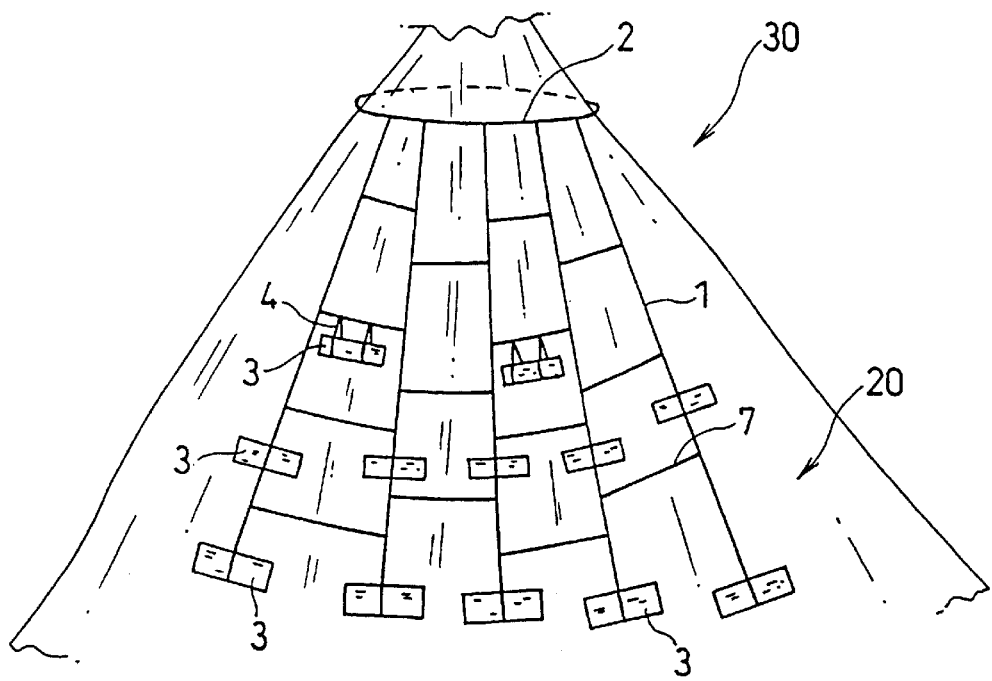
FIG. 7 is a schematic view explaining a work for preventing mountain landslides and a mountain-landslide-preventive structure.

FIG. 7 is a schematic view for explaining a work for preventing mountain landslides and a mountain-land slide-preventive structure.

In the embodiment shown in FIG. 7, a cable (2) is wound around the mountain near the mountain top (at about 80% of the distance from the bottom to the top of the mountain, for example) to serve as a base point (2). It is of course possible to connect the cable to base points such as concrete blocks. In that case, the cable serves as an auxiliary cable for indirectly fixing longitudinal cables (1) to base points (2).

In the embodiment shown in FIG. 7, the longitudinal cables (1) are present only on a particular slope (mountainside) of the mountain (30). However, the longitudinal cables (1) may be provided over all the slopes of the mountain. The longitudinal cables (1) may be arranged at any appropriate intervals. The longitudinal cables (1) are connected to each other via lateral cables (7). The positions of the lateral cables (7) are different between different rows having lateral cables (7). By adopting this configuration, it is possible to cope flexibly with any force (load) irrespective of its direction, when a force caused by a Mow etc. acts on the structure of the present invention.

The barrier-like members (3) are connected to the lateral cables (7) via the mooring cables (4), and directly to the longitudinal cables (1).

In this embodiment also, over time earth and gravel are retained at the upper side of the barrier-like members (3), to stabilize the mountainside (20), thus permitting planting and furling thereafter.

Figure 8:
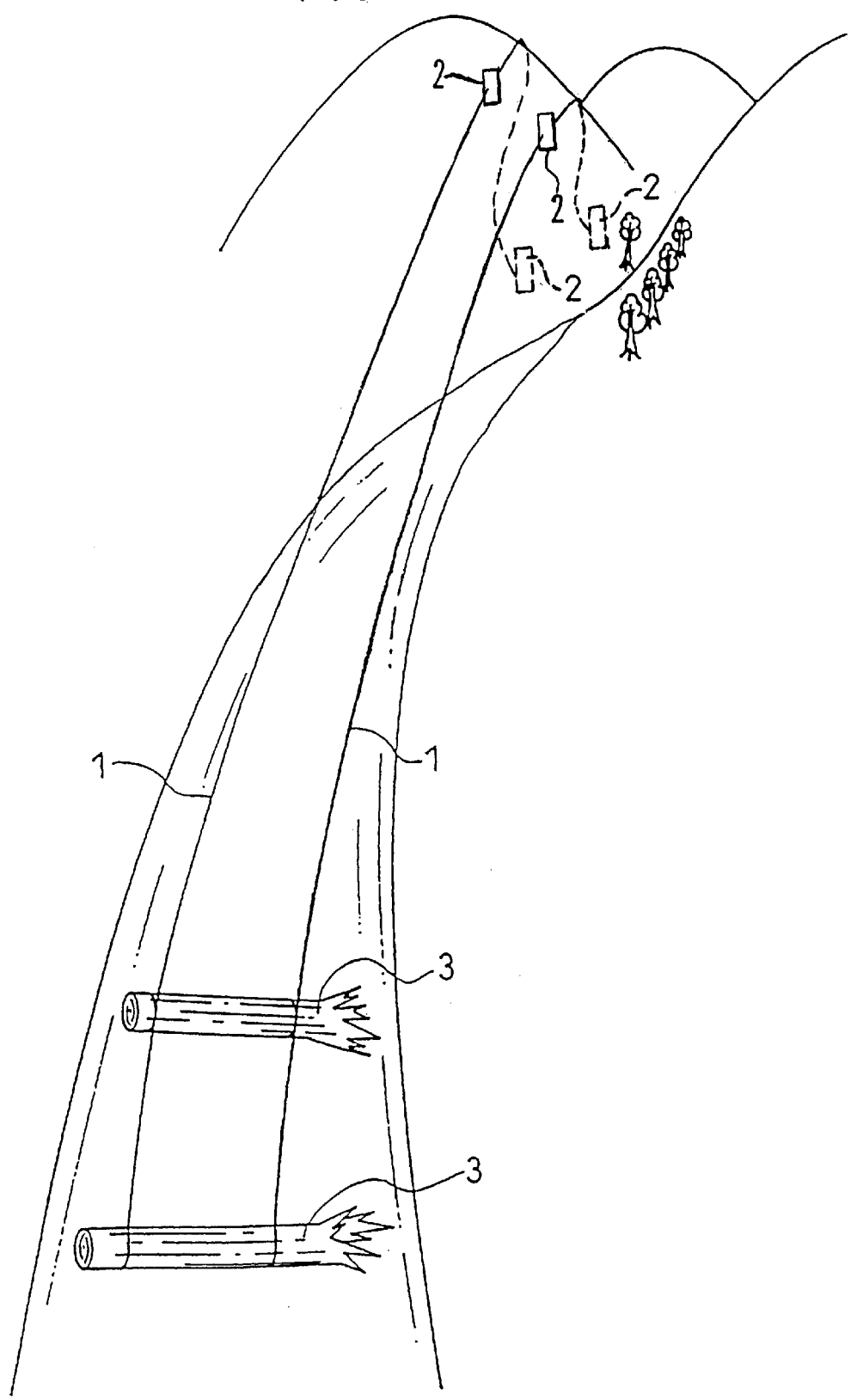
FIG. 8 is a schematic view for explaining a work on a stream or a river for preventing land erosion and improving a stream, and a land-erosion-preventive or stream-improving structure.

FIG. 8 is a schematic view for explaining a work on a stream or a river for preventing land erosion and improving a stream, and a land-erosion-preventive or stream-improving structure.

In the embodiment shown in FIG. 8, the longitudinal cables (1) mooring the barrier-like members (3) are connected to the base points (2) provided on the slope (mountainside) on which the mountain stream is located, and further extend to the opposite side of the mountain (not shown), across the ridge of the mountain, to also be fixed by base points (2) provided on the slope of the opposite side.

The rest of the configuration is the same as in the embodiment shown in FIG. 2.

In the present invention, there is no particular limitation imposed on the material for the longitudinal cable (1). Any material exhibiting a desired strength and excellent in water resistance may be used. An example is a steel cable. With the strength of steel cables that are now practically used, when timber, stones, or the like are moored with such steel cables, and are fixed at appropriate sites, there is no case where the steel cables are severed by a natural force, which severing results in a considerable displacement of the barrier-like members, or the barrier-like members in a large quantity flowing together over a short period. Various steel cables, including those specified in Japanese Industrial Standard G 3525, are available. Their breaking loads vary depending upon whether they are surface-treated, their types of twists used, their diameters, etc. An appropriate steel cable suitable for use may be selected, considering various conditions at the installation site of the structures of the present inventions. Another example of a longitudinal cable (1) is a steel chain.

Particularly in the case of, for example, a construction work for preventing mountain landslides of which the range of sites that are to be worked is wide, the length of the steel cable can be freely adjusted as desired. Thus, the steel cable is suitable as a longitudinal cable (1) or a lateral cable (7). In this case, since there is no substantial difficulty in covering the sites that are to be worked and this is a soft structure work (i.e., it is not always necessary to produce a solid construction), it is also possible to rapidly construct one at the site requiring such a work. Further, in the case of a soft structure work, using steel cables also has other advantages, such as easy modification, repair, and relocation of an installed construction. When it is possible to install a cable over a long span across a mountain ridge, it is not always necessary that the individual base points have a very high strength. Therefore, even when a work is conducted in a mountainous and isolated district, there is no serious difficulty.

As the base point (2), a tree, a rock, or an artificial structure such as a concrete block may be used.

When using a tree, it is not necessary that it be a big one, but it should have its roots fastened deep in the soil. If there are concerns about the strength of a tree as a base point (2), a single longitudinal cable (1) may be fixed to two or more trees. Particularly in a construction work for improving a stream or for a revetment along a stream, trees are effective and applicable as base points (2).

When using an artificial structure for this purpose, the size and the material may be appropriately selected according to the situation. In the construction work for preventing mountain landslides, there are some cases in which trees alone may be insufficient to satisfy the required number of base points (2), or in which no tree is present at an appropriate place. Therefore, it is recommended that base points (2) such as three-dimensional or circular pillar-shaped concrete blocks be provided. On the other hand, when artificial structures are installed in a stream or a river to use as base points (2), concrete structures such as Tetrapods (trademark) having a wave-breaking effect are preferably used.

When the structure of the present invention is used for preventing mountain landslides, a cable may be wound around the mountain at, for example, about 80% of the distance from the bottom to the top. Thus, the cable may serve as a base point (2).

For a land-erosion-preventive or stream-improving structure or a structure for a revetment, the base points (2) are provided on the shore of or in the stream or the river. Additionally, a base point (2) may be provided on the mountain slope on which the stream or river is located or on the ridge of the mountain, and the longitudinal cable (1) may be extended to reach the base point (2). Another preferred practice is to provide a base point (2) on the slope opposite the side of the mountain containing the stream or river, and to extend the longitudinal cable (1) to this base point (2). A site where the ground is stable should be found on such an opposite side of the mountain. As a result, a firm base point (2) can be ensured.

For a mountain-landslide preventive structure also, it is desirable to provide a base point (2) on a slope of the mountain opposite the mountainside having the barrier-like members (3) or, as required, on a mountain ridge, and to extend the longitudinal cable (1) to that base point (2).

Applicable barrier-like members (3) include timber, bound timber, timber connected in a venetian-blind shape, a concrete block, a wire cylinder filled with stones, particularly heavy stones, a sandbag, etc.

When barrier-like members (3) which are natural timber are installed separately or in combination stepwise at appropriate intervals on a stream bed suffering from serious erosion, using timber having roots or branches makes it possible to increase the effect of retaining flowing water or earth and gravel. For a revetment also, using timber having branches or roots as a barrier-like member (3) is effective.

As barrier-like members (3) that are installed in the downstream end of a stream or a river or near the piedmont, those having a long dimension are required when a single barrier-like member (3) is used. It is therefore desirable to use two or more barrier-like members (3) that are placed side-by-side. Additionally, the barrier-like members (3) are preferably connected to each other via connecting cables (6). In this arrangement, some earth and sand flows through the spaces between the barrier-like members (3) and further onto the downstream (or piedmont) side. However because the force acting on the barrier-like members (3) is dispersed, the structures of the present inventions can be prevented from breaking.

When installing the structures of the present inventions for the purpose of preventing a disaster caused by a collapse of a mountainside, it is another preferred practice to extend the longitudinal cable (1) on both sides of the mountain, across the mountain ridge, and to moor the barrier-like members (3) to both ends of the longitudinal cable (1). This permits coping with collapses within a wide range, or even out of the range of prediction, and effectively retaining earth, sand, and the like by the effect of not only the base points (2), but also by the force of the barrier-like members (3) provided on the side that has not collapsed. In this case, as shown in FIG. 5, the base points (2) can also be provided on just one side of the mountain, and the barrier-like members (3) may also be provided on only the side of the mountain where the base points (2) are not provided. In place of extending the longitudinal cable (1) over the mountain peak, an auxiliary cable (5) may be fixed to the base points (2) so as to make a circle at the height of about 80% of the distance from the bottom to the top of the mountain. Also, a plurality of longitudinal cables (1) may be connected to the auxiliary cable (5) to moor the barrier-like members (3) to the lower ends of the longitudinal cables (1). In place of extending the longitudinal cable (1) over the mountain peak, an auxiliary cable (5) may be fixed to the base points (2) so as to make a circle at the height of about 80% of the distance from the bottom to the top of the mountain Also, a plurality of longitudinal cables (1) may be connected to the auxiliary cable (5) to moor the barrier-like members (3) to the lower ends of the longitudinal cables (1).

Although the materials for the mooring cable (4), the auxiliary cable (5), the connecting cable (6) and the lateral cable (7) are not particularly limited, those that are the same as the material for the longitudinal cable (1) are preferably used.

The longitudinal cable (1) or the auxiliary cable (5) may be fixed to the base point (2) by any known method, such as winding it, fixing it by using metal fittings, or tying it. Connecting cables can also be easily made by using, e.g., metal fittings usually used for connecting steel cables. Mooring barrier-like members (3) by the longitudinal cable (1) or the mooring cable (4) does not require a special method. It suffices to select a method for making full use of the strength of the cable, and does not cause the barrier-like member (3) to flow toward the downstream end. The words "directly moored by using the longitudinal cable (1)" as used herein mean that a mooring cable (4) is not used. This meaning does not therefore preclude using such auxiliary tools such as metal fittings. Also, when using the auxiliary cable (4), auxiliary tools such as metal fittings can possibly be used.

To transport barrier-like members (3) such as long and heavy timber for a long distance to relocate and arrange them at necessary positions when employing the construction method of the present invention, the technology of gathering and transporting materials by means of any cabling commonly and presently used may be used.

Installing these cables and transporting and mooring, for example, timber, do not require a special high-level technology.

The necessary strength of the structure of the present invention varies with the installation site. Generally, however, the strength is determined by considering weather conditions at the installation site, soil quality, and the velocity and rate of flow of the river. A necessary strength is calculated by multiplying a value calculated on the basis of known formula incorporating these various factors by, for example, 1.2 (a safety factor of 20%).

One of the technical concepts of the present inventions is, as described above, the dispersion of the force acting on the barrier-like members by the use of a plurality of them. However, the present inventions do not preclude a structure having a single barrier-like member. In the aforementioned embodiment shown in FIG. 6, each structure has only a single barrier-like member. Other examples of the structures of the present inventions having a single barrier-like member (not shown in figures) include:

(a) one based on a process comprising the steps of winding a cable around a Tetrapod (trademark) serving as a base point (2) and being installed in a stream or a river to fix the cable to the Tetrapod (trademark), and winding the cable at its one unattached end around a barrier-like member (3) at a position near the center of the barrier-like member (3), or winding the cable at both its unattached ends around a barrier-like member (3) at positions near both ends of the barrier-like member (3), thus mooring one barrier-like member (3);

(b) one based on the steps of fixing one longitudinal cable (1) to one tree (a base point) and another longitudinal cable (1) to another tree (a base point) located on one shore of a stream or a river, and mooring a barrier-like member (3) with these two longitudinal cables (1); and (c) one in which a longitudinal cable (1) mooring a barrier-like member (3) via a mooring cable (4) is fixed to a base point (2) provided on a mountainside (made of concrete, or a tree or a rock when an appropriate one is available).

A construction method comprising installing a plurality of such structures is also within the technical concepts of the present inventions.

When the predicted value of a force acting on the barrier-like members (3) caused by a mudflow or the like occurring is small, just one structure having only a single barrier-like member (3) may be installed. Such a construction method is within the scope of another technical concept of the present inventions.

Effects of the Inventions

The main materials used in the construction works for preventing land erosion and improving a stream, for revetments, and for preventing mountain landslides according to the present inventions are steel cables, and timber or stones obtained from mountains or rivers.

These materials are far more easily procurable compared with conventional materials for such works in terms of quantity as well as cost. Therefore, the present inventions have considerable economic merits. Even when installing a steel cable over a long distance, large-scale work is not necessary if it is installed on the ground.

The methods of the present inventions are simple, and almost of them can be practiced by persons who do not have a special technical knowledge, as work like common labor in a forest.

In this work, there is almost no risk of destroying the work site, and there is only the slightest risk of damaging the scenery of the site. When natural timber and stones are used, environmental destruction via water pollution or the like is almost inconceivable, even after the natural timber and stones are buried or have decayed over a long period. Thus, in the present inventions a concept can be considered to be achieved in which the self-restoring power of nature is utilized and those resources coming from nature are returned to nature. That is, the present inventions not only protect nature by means of a forest (standing trees), but also cause the trees to play the role of protecting nature even after they are felled.

In the structures of the present inventions, the individual barrier-like members have only a limited effect on land-erosion prevention and stream improvement, or on a revetment. However, in the present inventions, there is available an erosion-preventive effect equal to or even superior to a large scale artificial dam or a revetment work as a whole, merely by increasing the number of barrier-like members.

This dam function expected for work for a stream can also be expected in other structures of the present inventions that aim at preventing any extensive collapse of a mountainside where there is increasing erosion and collapse. Other structures of the present inventions are prepared by arranging on the mountainside natural timber, wire cylinders, or the like in a large quantity, and connecting and securing them by means of steel cables. These structures permit the expectation that important functions of the mountainside will be restored over a relatively short period.

While a land-erosion-preventive and a stream improvement work or a revetment work using artificial structures such as concrete blocks seriously damages the precious natural landscape of scenic areas, the works of the present inventions can be accomplished without using concrete blocks or the like, and the natural environment can be maintained without damaging the landscape of the site.

By applying the methods of the present inventions, as described above, erosion of a stream, a river, or a mountainside on a huge scale can be coped with.

In Japan about 19,000 sites are reported to have steep inclines and to involve the risk of collapse, as of the end of March 1992. A 1993 survey reported about 79,000 streams which have a probable risk of mudflows and reported about 11,000 places exposed to a risk of a landslide (*Mountain Conservancy Handbook*, 1996 Edition, edited by the Mountain Conservancy Institute; see page 23). For fiscal 1995 (April 1995 through March 1996), Japan had a total budget for mountain conservancy operations of about 453 billion yen (*Mountain Conservancy Handbook*, 1996 Edition; see page 87).

For ordinary rivers also, the number of sites requiring a land-erosion-preventive or stream-improvement work or a revetment work and the budget for this purpose are considered to be almost on the same level as above.

Practice of the present inventions is far easier than the conventional methods as described above, and does not require huge costs for the work. Therefore, the range and sites of work for the prevention of erosion and collapse and restoration from such erosion and collapse in the natural land, particularly including mountainous lands, involving the above-mentioned risks, can therefore be greatly expanded. In the present inventions, timber and stones are the main materials. This means that mountain conservancy effects can be improved by the effective use of trees that have fallen because of wind, timber from culling, and earth and gravel from streams in large quantities, which to date have been of only limited economic value. By applying the present inventions to land erosion prevention, stream improvements, or revetments of ordinary rivers, safe rivers that are made with their natural scenery being considered, and which differ from conventional ones, which are made with Just their efficiency being considered, disregarding the natural environment, such as when a concrete structure is used, are achievable. Further, the present inventions provide general forestry workers with a considerable opportunity for employment, thus making contributions possible to stimulate farming and forestry villages. Application of the present inventions furthermore makes it possible, by artificial means, to prevent even large-scale erosion or collapse of mountainous land, and to restore it from such erosion or collapse, which has so far been believed to be almost impossible. To be more exact, even the dream of preventing the erosion of Mount Fuji may come true. Such effects of the present inventions are thus very remarkable.

What is claimed is:

1. A construction method for preventing mountain landslides mountains having a gradient, comprising:

(x) a step of fixing at least two longitudinal cables (1) to a base point (2) constituted by a cable that is wound around a mountain;

(y) a step of connecting said longitudinal cables (1) to each other with at least one lateral cable (7); and (z) a step of mooring at least two oblong members (3), having longer and shorter dimensions, directly to said longitudinal cables (1) or said lateral cable (7), or both, so that the at least two members (3) are provided at an interval in the gradient of the mountain with the longer dimension of each member (3) substantially at right angles to the gradient of the mountain.

2. The construction method for preventing mountain landslides according to claim 1, wherein at least one auxiliary cable (5) is used to fix said longitudinal cable or cables (1) to said base point (2).

3. The construction method for preventing mountain landslides according to claim 1, wherein at least one mooring cable (4) is used, that is connected to said longitudinal cable or cables (1) and/or said lateral cable (7), and is used to moor said oblong member or members (3) to said longitudinal cable or cables (1) and/or said lateral cable (7).

4. A mountain-landslide-preventive structure for use in mountains having a gradient, comprising at least one longitudinal cable (1), a base point (2) constituted by a cable that is wound around a mountain, and at least two oblong members (3), having longer and shorter dimensions, wherein said longitudinal cable (1) is fixed to said base point (2), and said members (3) are moored to said longitudinal cable (1) so that the members (3) are provided at an interval in the gradient of the mountain with their longer dimensions substantially at right angles to the gradient of the mountain.

5. The mountain-landslide-preventive structure according to claim 4, which further comprises at least one mooring cable (4) that is connected to said longitudinal cable (1), and is used to moor said oblong member or members (3).

6. The mountain-landslide-preventive structure according to claim 4, which further comprises an auxiliary cable (5) that is used to fix said longitudinal cable (1) to said base point (2).

7. A mountain-landslide-preventive structure for use in mountains having a gradient, comprising at least two longitudinal cables (1), a base point (2) constituted by a cable that is wound around a mountain, at least one lateral cable (7), and at least two oblong members (3), having longer and shorter dimensions, wherein said longitudinal cables (1) are fixed to said base point (2) and are connected to each other with said lateral cable (7), and said members (3) moored to said longitudinal cables (1) or said lateral cable (7), or both, so that the members (3) are provided at an interval in the direction of the gradient of the mountain with their longer dimensions substantially at right angles to the gradient of the mountain.

8. The mountain-landslide-preventive structure according to claim 7, which further comprises at least one auxiliary cable (5) that is used to fix said longitudinal cable or cables (1) to said base point (2).

9. The mountain-landslide-preventive structure according to claim 7, which further comprises at least one mooring cable (4) that is connected to said longitudinal cable or cables (1) and/or said lateral cable (7), and is used to moor said oblong member or members (3) to said longitudinal cable or cables (1) and/or said lateral cable (7).

* * * * *